United States Patent [19]

Blaha et al.

[11] 4,091,372
[45] May 23, 1978

[54] DIRECTIONAL CONTROL LEVER AND HORN ACTUATING ARRANGEMENT

[75] Inventors: James G. Blaha, Painesville; John R. Dineen, Maple Heights; John E. Wible, Painesville, all of Ohio

[73] Assignee: Towmotor Corporation, Mentor, Ohio

[21] Appl. No.: 693,025

[22] Filed: Jun. 4, 1976

[51] Int. Cl.² .......................... B60Q 1/26; H01H 9/06
[52] U.S. Cl. ................................. 340/282; 200/61.88; 340/70
[58] Field of Search ............... 200/61.54, 61.88, 61.91, 200/61.28, 4, 6 A; 340/70, 282

[56] References Cited

U.S. PATENT DOCUMENTS

| 2,294,192 | 8/1942 | Meierott | 200/61.88 |
| 2,622,161 | 12/1952 | Harter, Jr. | 200/6 A |
| 2,793,259 | 5/1957 | Parsons | 200/6 A |
| 2,829,213 | 4/1958 | Brett | 200/61.88 |
| 2,841,659 | 7/1958 | Eitel | 200/6 A X |
| 3,334,201 | 8/1967 | Mutschler et al. | 200/61.54 X |
| 3,419,684 | 12/1968 | Lord et al. | 200/4 |
| 3,627,958 | 12/1971 | Liedel et al. | 200/61.54 |
| 3,940,579 | 2/1976 | Buhl et al. | 200/4 |
| 3,996,433 | 12/1976 | Suzuki et al. | 200/61.54 X |

FOREIGN PATENT DOCUMENTS 1,318,882   5/1973   United Kingdom .............. 200/61.54

Primary Examiner—James R. Scott
Attorney, Agent, or Firm—Charles E. Lanchantin, Jr.

[57] ABSTRACT

A directional control lever and horn actuating arrangement is disclosed including a frame, a directional control lever assembly pivotally supported on the frame, a horn, an interrupted electrical circuit including a source of electricity which is selectively coupled to the horn for operation thereof, and a horn actuating mechanism supported by the control lever assembly and movable therewith which is disposed in communication with the electrical circuit and adapted to be manually positioned to complete the circuit and actuate the horn.

4 Claims, 2 Drawing Figures

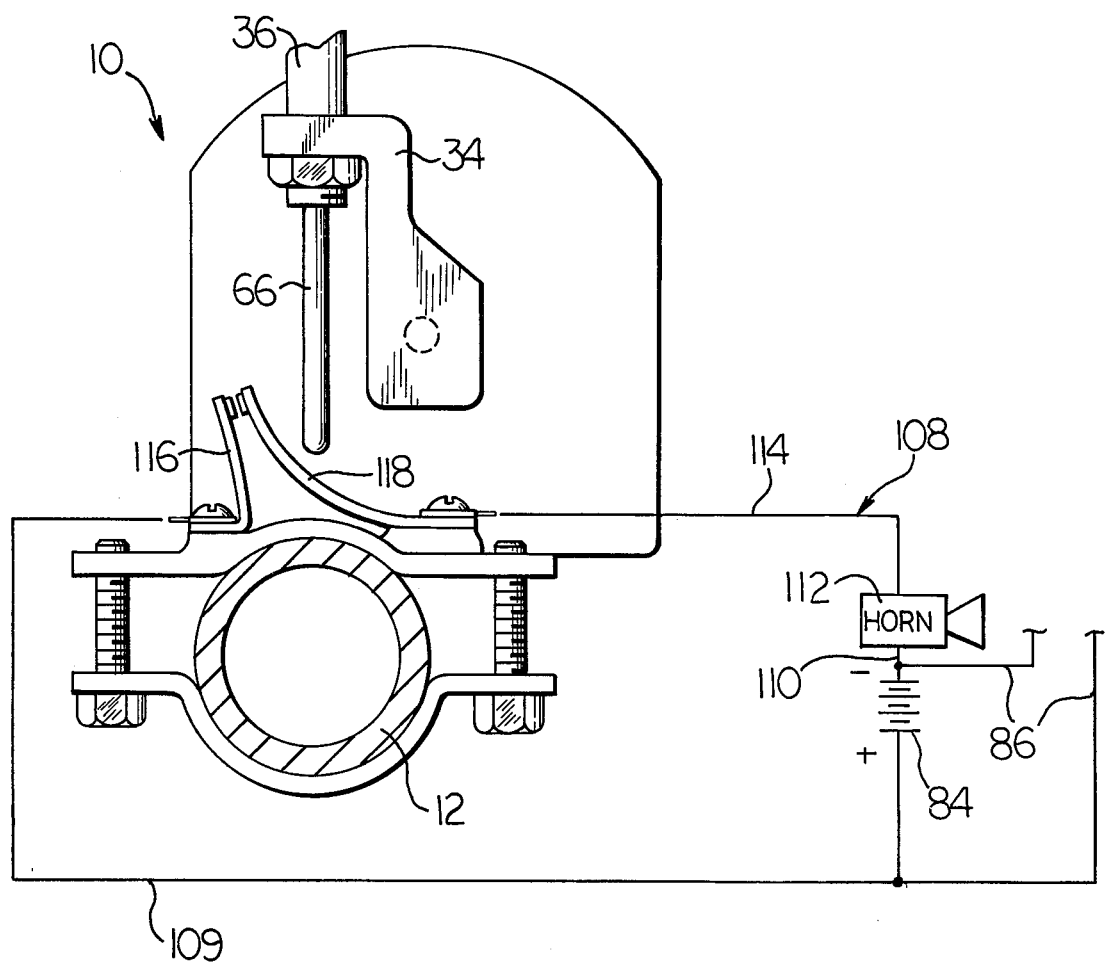

DIRECTIONAL CONTROL LEVER AND HORN ACTUATING ARRANGEMENT

BACKGROUND OF THE INVENTION

Heretofore, various horn actuating buttons and switches have been connected to rotate with the steering wheel of the vehicle. Consequently, the electrical circuit wires leading thereto are wound up and allowed to unwind every time steering corrections are made. This leads to a reduced service life of the wires and even shorting out or failure thereof.

To overcome this problem, some relatively sophisticated rotary sliding electrical connections have been adopted. However, these systems are difficult to install in the limited space available in and around the steering wheel, and are also excessively costly in construction.

Still another problem is that the vehicle operator is frequently turning the steering wheel with one hand while simultaneously making frequent directional changes with the transmission shifting mechanism with the other. Accordingly, the horn actuating button must be conveniently located within the normal work area of at least one of his hands. In the case of operating an electrically driven fork lift truck, for example, and to avoid the problems mentioned above, the horn button should be closely associated with the directional control lever rather than the steering wheel for reasons of economy of motion.

SUMMARY AND OBJECTS OF THE INVENTION

It is therefore an object of the present invention to provide an improved directional control lever and horn actuating arrangement which will allow convenient operation of the horn of a vehicle.

It is another object of the invention to provide an arrangement of the character described which is reliable in its construction, such as by eliminating movement of electrical wires and/or continually sliding contacts connected therewith.

It is another object of the invention to provide an arrangement of the aforementioned type which is economical in its construction.

Other objects and advantages of the present invention will become more readily apparent upon reference to the accompanying drawings and the following description.

BRIEF DESCRIPTION OF THE DRAWINGS

FIG. 2 is a fragmentary horizontal plan view similar to FIG. 1, only diagrammatically simplified and showing an alternate embodiment of the present invention.

DESCRIPTION OF THE PREFERRED EMBODIMENT

Figure 1:
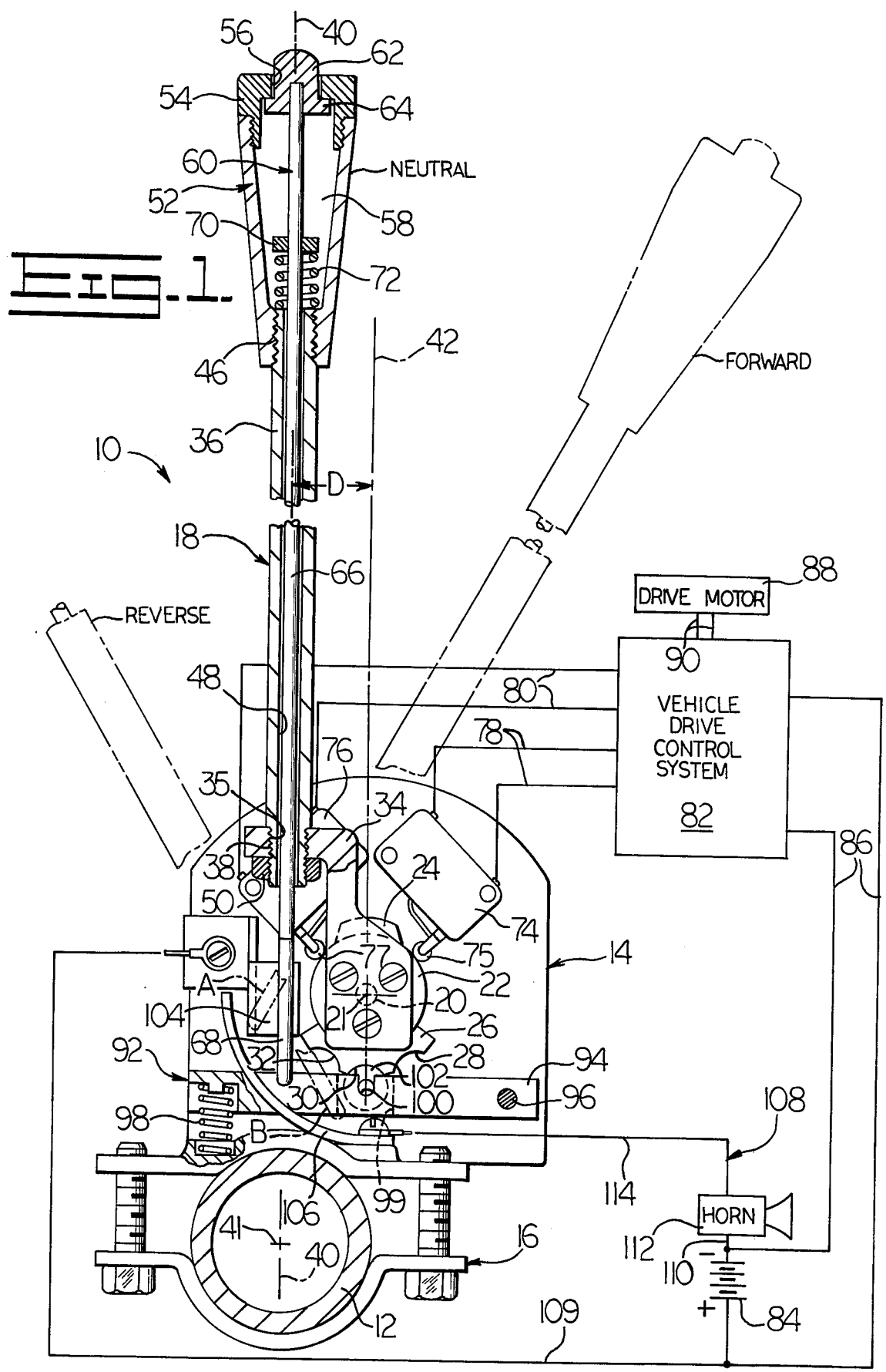
FIG. 1 is a horizontal plane view of the directional control lever and horn actuating arrangement of the present invention with portions thereof shown in section to better illustrate details of construction thereof, and with diagrammatic electrical circuits connected therewith.

Referring to FIG. 1, the directional control lever and horn actuating arrangement 10 of the present invention is seen as extending radially outwardly from a stationary steering column 12 of a vehicle such as a conventional fork lift truck, not shown. A frame 14 is secured to the steering column, as by a removable clamping apparatus 16, and a directional control lever assembly 18 is pivotally supported for limited arcuate movement on the frame on a pivot shaft 20 having an upright pivot axis 21.

The directional control lever assembly 18 includes a centrally disposed cylindrical body 22 pivotally mounted on the pivot shaft 20, which body has a directional cam member 24 on one side and a three-position detent member 26 on its opposite side. The detent member has a forward detent notch 28, a centrally disposed neutral notch 30 and a reverse detent notch 32 therein. A lever holding bracket 34 having a threaded bore 35 therethrough is suitably secured to the body 22, and a cylindrical control lever 36 is mounted thereon through a reduced diameter externally threaded inner end 38 which is threadably inserted in said bore. It is to be noted that with this construction the control lever 36 is oriented along a central axis 40 which extends through a central axis 41 of the steering column 12 when the lever is placed in the solid line neutral condition illustrated. Moreover, it is apparent that the axis 40 is parallel to, and offset rearwardly a distance D from, a laterally oriented upright plane 42 passing centrally through the axis 21.

More particularly, the control lever 36 of the directional control lever assembly 18 has an externally threaded outer end 46 and an axially disposed passage 48 extending fully centrally therethrough. An internally threaded nut 50 is screw threadably installed on its inner end 38 to rigidly secure the control lever to the supporting bracket 34. Furthermore, a hollow control handle 52 is screw threadably installed on its outer end. The handle includes an end plate 54 with a bore 56 therethrough which opens radially into an internal chamber 58 formed centrally within it.

In accordance with the present invention, a horn actuating mechanism 60 is supported longitudinally within the control lever assembly 18. This mechanism includes a horn button 62 which is disposed for reciprocal movement within the bore 56, and with the button having an internal flange 64 thereon which is adapted to seat outwardly against the end plate 54. An elongated cylindrical actuating rod 66 is secured to the button which extends generally radially inwardly through the chamber 58 and the passage 48 and exteriorly beyond the inner extremity of the control lever 36. The actuating rod is made from a material that is electrically non-conducting along the majority of its length. However, pursuant to the present invention, the inner end of the rod is provided with an electrically conducting contact tip 68 which serves as a circuit-completing contact member as will be later more fully described.

In order to bias the horn actuating mechanism 60 to a normally open position, a spring seat 70 is rigidly secured to the actuating rod 66 near its outer end. A resilient element, such as a coiled compression spring 72, surrounds the rod and is engaged with this seat and is also engaged with the outer end of the control lever 36. Consequently, it is apparent that the rod is thus urged generally radially outwardly until the flange 64 of the button 62 makes contact with the end plate 54.

Referring now to the stationary frame 14, provision is made to mount thereon a forward directional control switch 74 with a depressible actuator 75 and a reverse directional control switch 76 with a depressible actuator 77 in a symmetrical manner on either side of the plane 42. A pair of electrical connecting lines 78 and a pair of connecting lines 80 respectively communicate with the switches 74 and 76 and appropriate circuitry, not shown, within a vehicle drive control system 82. This control system communicates with a source of electricity such as a battery 84 through a pair of connecting lines 86, and is selectively operated by pivotal movement of the directional control lever assembly 18 from its central condition shown to deliver power to a reversible drive motor 88 through a plurality of electrical leads 90.

Also, mounted to the frame 14 is a resiliently loaded detent mechanism 92. This mechanism includes a bar 94 that is pivotally mounted on a shaft 96 secured to the frame, and has a resilient element such as a compression spring 98 seated against it and the frame so that the left end of the bar is urged upwardly when viewing the drawing. A vertical opening 99 is formed in the bar and a depression 100 is formed centrally across it to permit a roller 102 to be fully rotationally seated within the depression for selective engagement with the notches 28, 30 and 32 of the detent member 26.

In accordance with one aspect of the invention, an electrically conducting, resilient projection or finger 104 is insulatably secured to the frame 14 in such a way that it is continually slidably engaged against the contact tip 68 of the horn actuating mechanism 60. Further, an arcuately profiled contact bar 106 is also secured to the frame in axially spaced relation from the end of the contact tip. Advantageously, this bar is curved with a predetermined radius from the pivot axis 21 so that it is spaced at a constant distance from the contact tip in its normally open condition despite its pivotal orientation.

In carrying out the present invention, an interruptable electrical horn actuating circuit 108 is provided which includes in serially arranged order the resilient projection 104, a wire lead 109, the battery 84, a wire lead 110, an electrically powered vehicle horn 112, and a wire lead 114 connected to the profiled contact bar 106. With the actuating rod 66 extended radially outwardly or upwardly when viewing the drawing, the circuit is open so that the horn is not operated. However, since the contact tip 68 thereof is always in electrical communication with the projection 104 and the positive side of the battery, it is only necessary to manually depress the button 62 and its associated actuating rod to urge the tip into engagement with the contact bar to close the circuit and to actuate the horn.

OPERATION

While the operation of the present invention is believed clearly apparent from the foregoing description, further amplification will subsequently be made in the following brief summary of such operation. Assuming that the directional control lever assembly 18 is manually positioned from the solid line neutral position to the forward establishing position illustrated in broken lines to the right side thereof when viewing the drawing, it is apparent that the roller 102 of the detent mechanism 92 disengages from the detent notch 30 and is, subsequently, engaged in the forward detent notch 28. This serves to positively locate and retain the control lever in the correct pivotal attitude. Simultaneously, the body 22 is angularly rotated in a corresponding clockwise manner whereupon the cam member 24 engages and depresses the actuator 75. This causes actuation of the forward directional control switch 74 to close and to electrically connect the lines 78 leading to the vehicle drive control system 82.

With the vehicle drive control system 82 activated in a forward drive mode as set forth above, the control system can be separately manually operated by a foot pedal or the like, not shown, to accelerate the drive motor 88 and to move the vehicle forwardly in the usual manner. Of course, it is clearly apparent that pivotal movement of the directional control lever assembly 18 to the left when viewing the drawing will activate the reverse actuator 77 and directional control switch 76 and will electrically connect the lines 80 to place the control system in a reverse drive mode.

In keeping with the present invention, however, the operator can conveniently operate the horn 112 with the same hand that is moving the directional control lever assembly 18, and can achieve this equally as well in any pivotal position thereof. All that is necessary is to depress the button 62 and cause sufficient inward radial movement of the rod 66 so that the tip 68 makes contact with the bar 106. This completes the loop connection of the actuating circuit 108 and electrically operates the vehicle horn.

In this connection, reference is made to the forward and reverse positions of the contact tip 68 shown in fragmentary phantom outline and respectively identified by the reference letters A and B. It is apparent that even with this range of pivotal movement of the tip, the resilient projection 104 is positively and continually biased into sliding electrical contact with it because of its broad and flexible metallic construction.

DESCRIPTION OF ALTERNATE EMBODIMENT

Referring now to FIG. 2, an alternate embodiment directional control lever and horn actuating arrangement 10 is diagrammatically shown, with elements similar to the preferred embodiment being identified with identical reference numerals. However, while the majority of the arrangement is the same, an electrically conducting deflectable contact member 116 is connected to the wire lead 109 and a cooperatively facing deflectable contact member 118 is connected to the wire lead 114 of the horn actuating circuit 108. It is clearly apparent that the contact member 118 is normally disposed in limitedly spaced apart relation from the contact member 116 as is illustrated so that the horn actuating circuit is interrupted. But when it is desired to operate the horn 112, the actuating rod 66 is moved downwardly when viewing FIG. 2 in the same manner as previously described to abut the contact member 118 and to thereafter deflect it against the contact member 116 so that current is allowed to flow between the wire leads 109 and 114. This closes the electrical circuit and actuates the horn. When the horn button 62 shown in FIG. 1 is released, the rod 66 is pulled away from the contact member 118 to open the circuit again. In contrast to the preferred embodiment, the alternate rod need not have an electrically conducting contact tip 68 since it is used only for effecting closing of the spaced apart contact members.

It is therefore apparent that the directional control lever and horn actuating arrangement 10 of the present invention is easy to operate, and is reliable in its construction such as by eliminating moving wires that could reduce the service life thereof.

While the invention has been described and shown with particular reference to a preferred embodiment and one alternate embodiment, it will be apparent that variations might be possible that would fall within the scope of the present invention, which is not intended to be limited except as defined in the following claims.

What is claimed is:

1. A directional control lever and horn actuating arrangement comprising:
   a frame;
   a directional control lever assembly having a control lever arranged on a central axis and being pivotally supported on said frame for movement about a pivot axis into a plurality of operating positions;
   an electrical circuit including in serially communicating order a first contact member, a source of electricity connected to said first contact member, a horn connected to said source of electricity and a second contact member connected to said horn and being spaced from said first contact member and providing an electrically open circuit condition, said circuit being connected to said frame, one of said contact members being arcuately profiled and defining a substantially fixed distance from said pivot axis; and
   manually actuated means including a movable element supported by said directional control lever assembly and selectively movable along said central axis between first and second positions for contacting said arcuately profiled contact member, electrically connecting said first and second contact members and selectively actuating said horn, said first position of said movable element maintaining a preselected distance from said arcuately profiled contact member when said control lever is rotated about said pivot axis.

2. The directional control lever and horn actuating arrangement of claim 1 wherein said movable element directly biases said arcuately profiled contact member into electrical engagement with the other one of said contact members in said second position of the movable element to operate said horn.

3. The directional control lever and horn actuating arrangement of claim 1 wherein said movable element bridges said first and second contact members in said second position of the movable element, electrically connecting said first and second contact members and operating said horn.

4. The directional control lever and horn actuating arrangement of claim 3 wherein said movable element has an electrically conducting inner contact tip and an electrically nonconducting outer portion, said contact tip being continually in sliding electrical contact with one of said first and second contact members.

* * * * *